(12) United States Patent
Nakagawa (10) Patent No.: US 8,517,299 B2
(45) Date of Patent: Aug. 27, 2013

(54) DUAL-BEARING REEL SPOOL-BRAKING DEVICE

(75) Inventor: Shouji Nakagawa, Osaka (JP)

(73) Assignee: Shimano Inc., Osaka (JP)

( * ) Notice: Subject to any disclaimer, the term of this patent is extended or adjusted under 35 U.S.C. 154(b) by 620 days.

(21) Appl. No.: 12/754,320

(22) Filed: Apr. 5, 2010

(65) Prior Publication Data

US 2010/0288866 A1    Nov. 18, 2010

(30) Foreign Application Priority Data

May 15, 2009 (JP) .................................. 2009-118356

(51) Int. Cl.
*A01K 89/01* (2006.01)
(52) U.S. Cl.
USPC ............ 242/319; 242/289; 242/312; 242/315
(58) Field of Classification Search
USPC .......................... 242/289, 301, 312, 315, 319
See application file for complete search history.

(56) References Cited

U.S. PATENT DOCUMENTS

| | | | | |
|---|---|---|---|---|
| 5,577,680 A * | 11/1996 | Ikuta | ............................. | 242/313 |
| 5,803,385 A * | 9/1998 | Baisch | ........................... | 242/289 |
| 6,045,073 A * | 4/2000 | Ikuta | ............................. | 242/260 |
| 6,254,021 B1 * | 7/2001 | Morimoto et al. | ............ | 242/289 |
| 6,286,773 B1 * | 9/2001 | Ikuta | ............................. | 242/260 |
| 6,364,230 B1 * | 4/2002 | Kawasaki | ...................... | 242/289 |
| 6,412,720 B1 * | 7/2002 | Ikuta | ............................. | 242/269 |
| 6,460,793 B1 | 10/2002 | Hirayama et al. | | |
| 6,474,580 B1 * | 11/2002 | Hirayama | ...................... | 242/289 |
| 6,481,657 B1 * | 11/2002 | Oishi et al. | .................... | 242/289 |
| 6,966,517 B2 * | 11/2005 | Seo | ............................... | 242/289 |
| 7,086,621 B1 * | 8/2006 | Matsuzawa et al. | .......... | 242/289 |

FOREIGN PATENT DOCUMENTS

| | | |
|---|---|---|
| EP | 1 413 196 A2 | 4/2004 |
| JP | H06-003081 U | 1/1994 |
| JP | H06-038533 U | 5/1994 |

OTHER PUBLICATIONS

The extended European Search Report of corresponding European Application No. 10161292.7 dated Sep. 13, 2010.

* cited by examiner

*Primary Examiner* — Emmanuel M Marcelo
(74) *Attorney, Agent, or Firm* — Global IP Counselors, LLP (57) ABSTRACT

A dual-bearing reel spool-braking device configured to brake a spool rotatably attached to a reel body having first and second side plates has a tubular brake member, a moving member, and a cover member. The tubular brake member is attached to the first or second side plate, and has a base and an opening. The brake member is disposed such that the opening is opposed to the spool. The moving member is axially non-movably attached to a rotation shaft of the spool, and contacts an inner peripheral surface of the brake member when the moving member is moved towards the brake member by centrifugal force generated by rotation of the spool. The cover member is attached to the first or second side plate to cover the opening of the brake member.

14 Claims, 7 Drawing Sheets

DUAL-BEARING REEL SPOOL-BRAKING DEVICE

CROSS-REFERENCE TO RELATED APPLICATIONS

This application claims priority to Japanese Patent Application No. 2009-118356 filed on May 15, 2009, the entirety of which is hereby incorporated by reference in its entirety.

BACKGROUND

1. Field of the Invention

The present invention relates to a spool brake device, especially to a dual-bearing reel spool-braking device for braking a spool rotatably attached to a reel body provided with a pair of side plates.

2. Background Information

Brake force is normally applied to a dual-bearing reel spool mainly used for lure fishing in order to prevent backlash from occurring when spool revolution is faster than fishing-line release speed while casting. Laid-open Japanese Utility Model Publications Nos. H06-003081 and H06-038533 describe the aforementioned well-known spool-braking devices respectively provided with a centrifugal brake device for braking a spool by way of centrifugal force that is generated when the spool rotates.

For example, the centrifugal brake device of this type includes a rotation member, plural guide shafts, plural moving members, and a braking member. The rotation member rotates in conjunction with spool rotation. The guide shafts are attached to the rotation member in a radial arrangement. The moving members are attached to both ends of the respective guide shafts while being axially movable. The braking member is provided on a reel body while being prevented from rotating. The braking member is a tubular member having a base disposed on the outer peripheral side of the moving member. The braking member is non-rotatably attached to a side plate disposed on the side opposite the handle-attachment side. When the spool rotates, the centrifugal braking device of this type is configured to apply centrifugal force to the moving members attached to the guide shafts. The moving member accordingly moves towards an outward direction of the spool shaft and makes contact with the braking member. The spool is thereby braked.

According to the spool-braking device described in Laid-open Japanese Utility Model Publication No. H06-003081, the brake member is a tubular member having a base and an opening opposed to the spool. The structure may allow water to enter the interior of the braking member through the opening. When water enters the interior of the brake member, water drops may attach to the moving member and/or the braking surface of the braking member. Brake force varies when the moving member makes contact with the braking surface of the braking member. This makes it difficult to generate stable force for braking the spool.

Further, a cover member is secured to the braking member by means of screws in the spool-braking device described in Laid-open Japanese Utility Model Publication No. H06-038533 (see FIGS. 7-10 of the reference). The structure reduces the chances of allowing water to enter the interior of the braking member. However, the spool shaft and a support member for supporting the moving member are required to be detachably engaged and to rotate relatively. Therefore, vibration and/or noise may be generated in the engaged part and a spool-braking efficiency may be reduced.

In view of the above, it will be apparent to those skilled in the art from this disclosure that there exists a need for an improved dual-bearing reel spool-braking device. This invention addresses this need in the art as well as other needs, which will become apparent to those skilled in the art from this disclosure.

SUMMARY

An object is to generate reliably stable force for braking a spool in a dual-bearing reel spool-braking device.

A dual-bearing reel spool-braking device according to a first aspect is configured to brake a spool rotatably attached to a reel body that has a pair of side plates. The dual-bearing reel spool-braking device includes a tubular brake member, a moving member, and a cover member. The brake member is attached to one of the side plates. The brake member has a length, a radius, an end having a base extending in a radial direction of the tubular brake member perpendicular or substantially perpendicular to the length of the tubular brake member, and an opening. The base can be completely closed or have at least one opening. The brake member is disposed in a condition such that the opening is opposed to the spool. The moving member is axially non-movably attached to a rotation shaft of the spool. The moving member is arranged and configured to make contact with an inner peripheral surface of the brake member when it is moved towards the brake member by way of centrifugal force generated by rotation of the spool. The cover member is attached to the one or the other of the side plates to cover the opening of the brake member.

The cover member is provided on the dual-bearing reel spool-braking device in order to cover the opening of the brake member. Water can be thereby prevented from entering the interior of the brake member. In other words, water drops never attach to the moving member and/or the brake member. Accordingly, a stable braking force can be reliably generated for a spool.

Further, to execute adjustment of the moving member, it is required in the prior art to remove the brake member and subsequently further to remove the cover member from the brake member in the structure in which the cover member is fixed to the brake member by screws. This structure, for instance, is disclosed in Laid-open Japanese Utility Model Publication No. H06-038533 (see FIGS. 7 to 10 of the reference). In contrast, a cover member of the first aspect is attached to one of the side plates. Therefore, the opening of the side plate will be uncovered only by removing the brake member whereas the cover member remains attached to one of the side plates. Consequently, adjustment of the moving member can be more easily executed than in the aforementioned case.

A dual-bearing reel spool-braking device according to a second aspect relates to the dual-bearing reel spool-braking device of the first aspect, wherein the foregoing one of the side plates includes an opening with an inner periphery, and the cover is attached to the one of the side plates. Thus, the attachment of the cover member is achieved with a more simple structure than attachment of the cover member using a screw.

Further, the spool cannot be easily attached/detached to/from the reel body in a structure in which the moving member is directly supported by the spool shaft, for instance, as described in Laid-open Japanese Utility Model Publication No. H06-038533 (see FIGS. 15 and 16 of the reference). Maintenance of the reel will be thereby difficult in such a case. According to the cover member of the second aspect, however, the cover member can be easily attached/detached to/from the side plate together with the spool. Therefore, reel maintenance will be easier than in the aforementioned case.

A dual-bearing reel spool-braking device according to a third aspect relates to the dual-bearing reel spool-braking device of the second aspect, wherein the cover member includes a plate-shaped tab interposed between and held by the end surface of the brake member opposed to the spool and the end surface of the step not opposed to the spool. In this case, the plate-shaped tab is interposed between and held by the end surface of the brake member and the end surface of the step. Therefore, attachment of the cover member is achieved with a simple structure.

A dual-bearing reel spool-braking device according to a fourth aspect relates to the dual-bearing reel spool-braking device of one of the first to third aspects, wherein the cover member is formed in a saucer shape and a diameter thereof increases in an axial direction away from the spool. In this case, the cover member is formed in a saucer shape, and includes a space for avoiding contact with the moving member. The cover member can be thereby more compactly disposed than a tubular-shaped cover member.

A dual-bearing reel spool-braking device according to a fifth aspect relates to the dual-bearing reel spool-braking device according to one of the first to fourth aspects, wherein the cover member is made of a metal thin plate. In this case, the cover member is a thin plate member formed by executing press working of aluminum alloy or the like, for instance. Therefore, weight of the cover member can be reduced.

A dual-bearing reel spool-braking device according to a sixth aspect relates to the dual-bearing reel spool-braking device according to one of the first to fifth aspects, wherein the brake member includes a male threaded portion on an outer periphery thereof. The male threaded portion is screwed into a female threaded portion formed in the opening of the one of the side plates. In this case, the brake member can be easily and reliably attached/detached to/from the other of the side plates.

A dual-bearing reel spool-braking device according to a seventh aspect relates to the dual-bearing reel spool-braking device of one of the first to sixth aspects, wherein the brake member includes a support portion for supporting an end portion of the rotation shaft of the spool. In this case, the end portion of the spool shaft can be supported by a bearing or the like provided as the support portion on the bottom end or base of the tubular brake member.

A dual-bearing reel spool-braking device according to an eighth aspect relates to the dual-bearing reel spool-braking device of one of the first to seventh aspects, and further includes a contact-state switching device to switch between a contactable state and a non-contactable state in response to an external handling of the moving member. The contactable state herein allows the moving member to make contact with the brake member, whereas the non-contactable state prevents the moving member from making contact with the brake member. In this case, brake force can be regulated by an external handling of the moving member. The cover member is herein attached to one of the side plates. The opening of the cover member is uncovered only by removing the brake member whereas the cover member remains to be attached to one of the side plates. Consequently, the moving member will be easily adjusted.

A dual-bearing reel spool-braking device according to a ninth aspect relates to the dual-bearing reel spool-braking device of one of the first to eighth aspects, wherein the cover member is attached to the spool to rotate relatively with the spool. In this case, the cover member is attached to the spool, and can relatively rotate with it. This prevents the cover member from blocking smooth rotation of the spool even if the cover member is closely attached to the reel body.

A dual-bearing reel spool-braking device according to a tenth aspect relates to the dual-bearing reel spool-braking device of one of the first to ninth aspects, and further includes a rotation member disposed on an inner peripheral side of the brake member. The rotation member has an outer periphery to which the moving member is radially movably attached. Further, the rotation member has an inner periphery fixed to the rotation shaft of the spool. The cover member includes a through hole to allow the rotation shaft of the spool to penetrate. The through hole has a diameter slightly greater than an outer diameter of a penetration portion of the rotation shaft of the spool. The cover member is disposed between the rotation member and the spool while the rotation shaft of the spool penetrates the through hole. In this case, the cover member is disposed between the rotation member and the spool. This structure produces a space between the spool and the cover member and a space between the cover member and the rotation member. In other words, a kind of labyrinth structure is produced, and the structure can reliably block water from entering the interior of the brake member.

According to the dual-bearing reel spool-braking device of this disclosure, the cover member is provided on the dual-bearing reel spool-braking device in order to cover the opening of the braking member. This structure can reliably generate a stable force for braking the spool.

These and other objects, features, aspects, and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
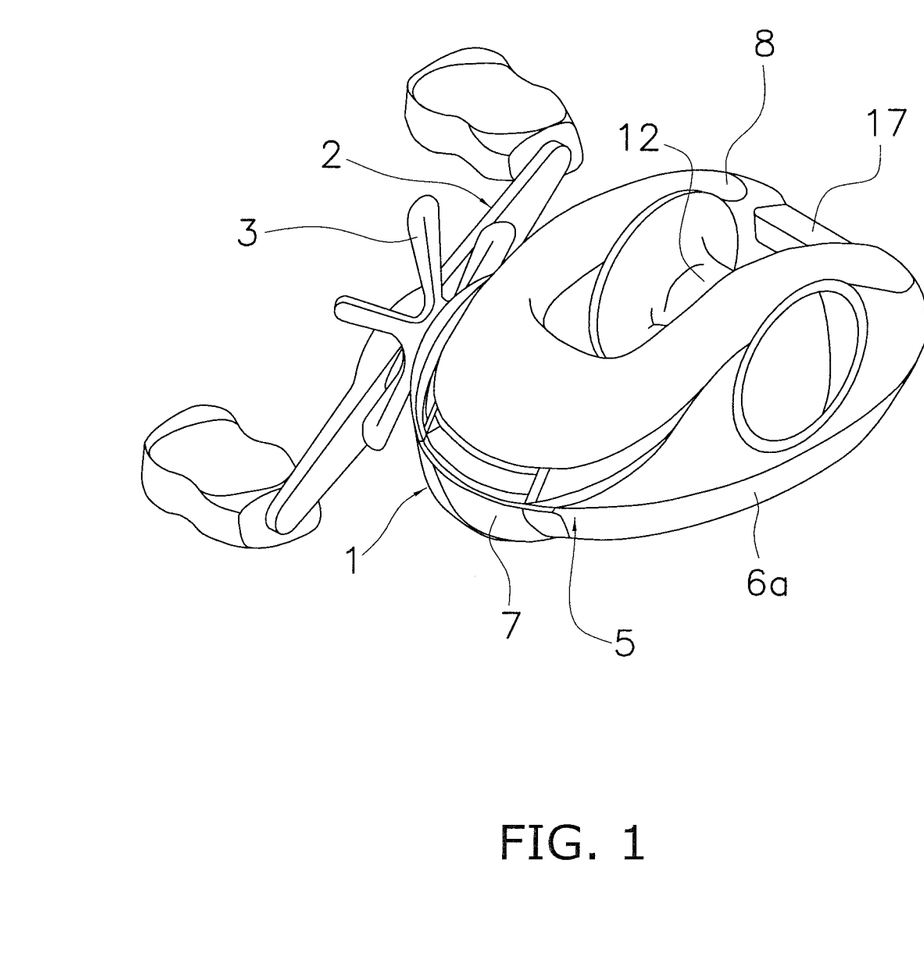
FIG. 1 is an oblique perspective view of a dual-bearing reel in accordance with an embodiment.

As illustrated in FIG. 1, a dual-bearing reel in accordance with an exemplary embodiment is a small size low-profile reel for bait casting. The reel includes a reel body 1, a handle 2 for rotating a spool 12, and a star drag 3 for regulating drag force. The handle 2 is disposed lateral to the reel body 1. The star drag 3 is interposed between the handle 2 and the reel body 1.

Figure 2:
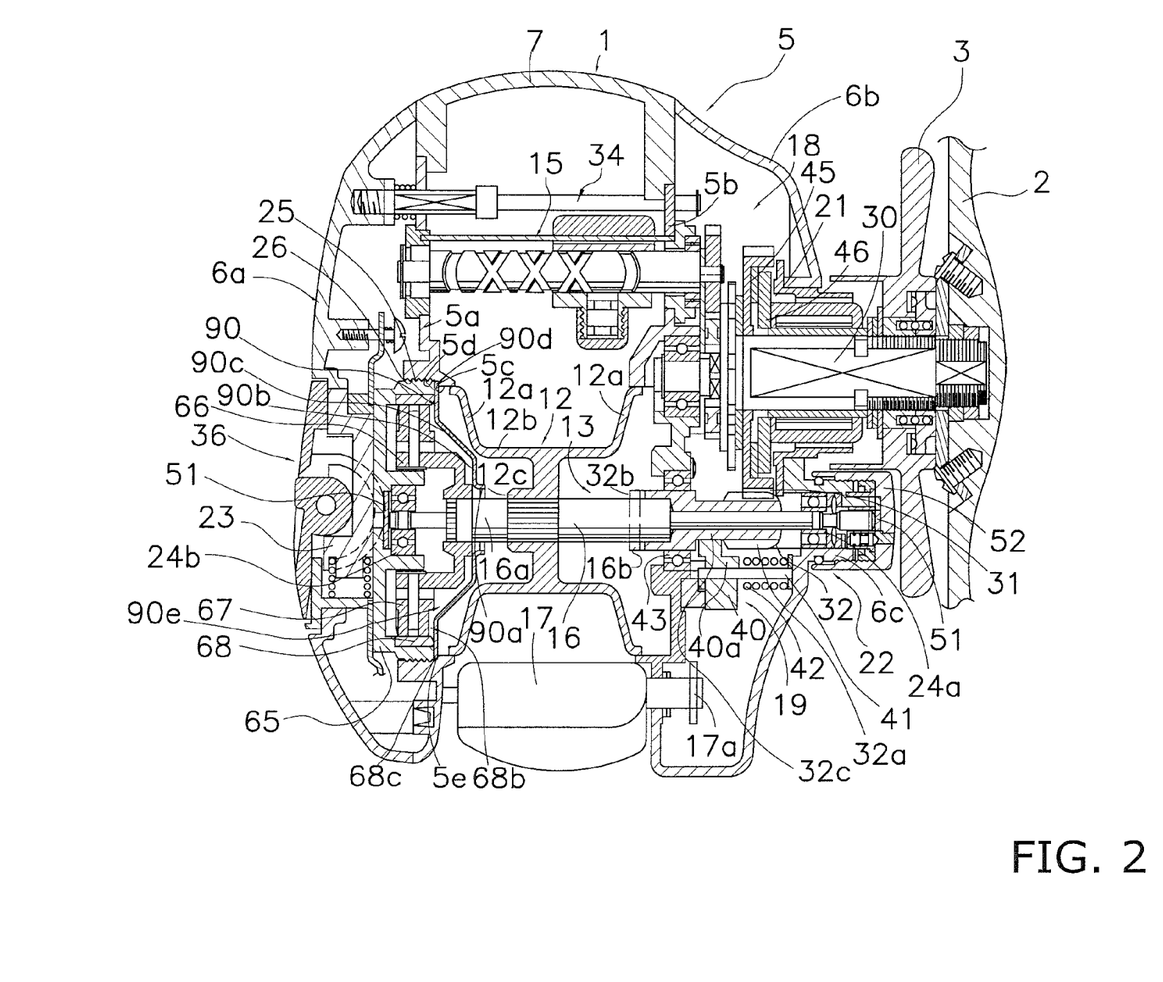
FIG. 2 is a cross-sectional view of the dual-bearing reel.

As illustrated in FIG. 2, the reel body 1 includes a frame 5, a first side cover 6a and a second side cover 6b. The first and second side covers 6a and 6b are disposed on both sides of the frame 5. Further, the reel body 1 includes a front cover 7 and a thumb rest 8, as illustrated in FIG. 1. The front cover 7 covers the front of the reel body 1, whereas the thumb rest 8 covers the top of the reel body 1. The spool 12 for winding a fishing line is detachably attached to the interior of the reel body 1 while being relatively rotatable.

As seen in FIG. 2, the frame 5 includes a pair of side plates, i.e., a first side plate 5a and a second side plate 5b, and a plurality of couplers (not illustrated in the figure). The first and second side plates 5a and 5b are opposed to each other by a predetermined distance. The couplers couple the first and second side plates 5a and 5b.

Figure 3:
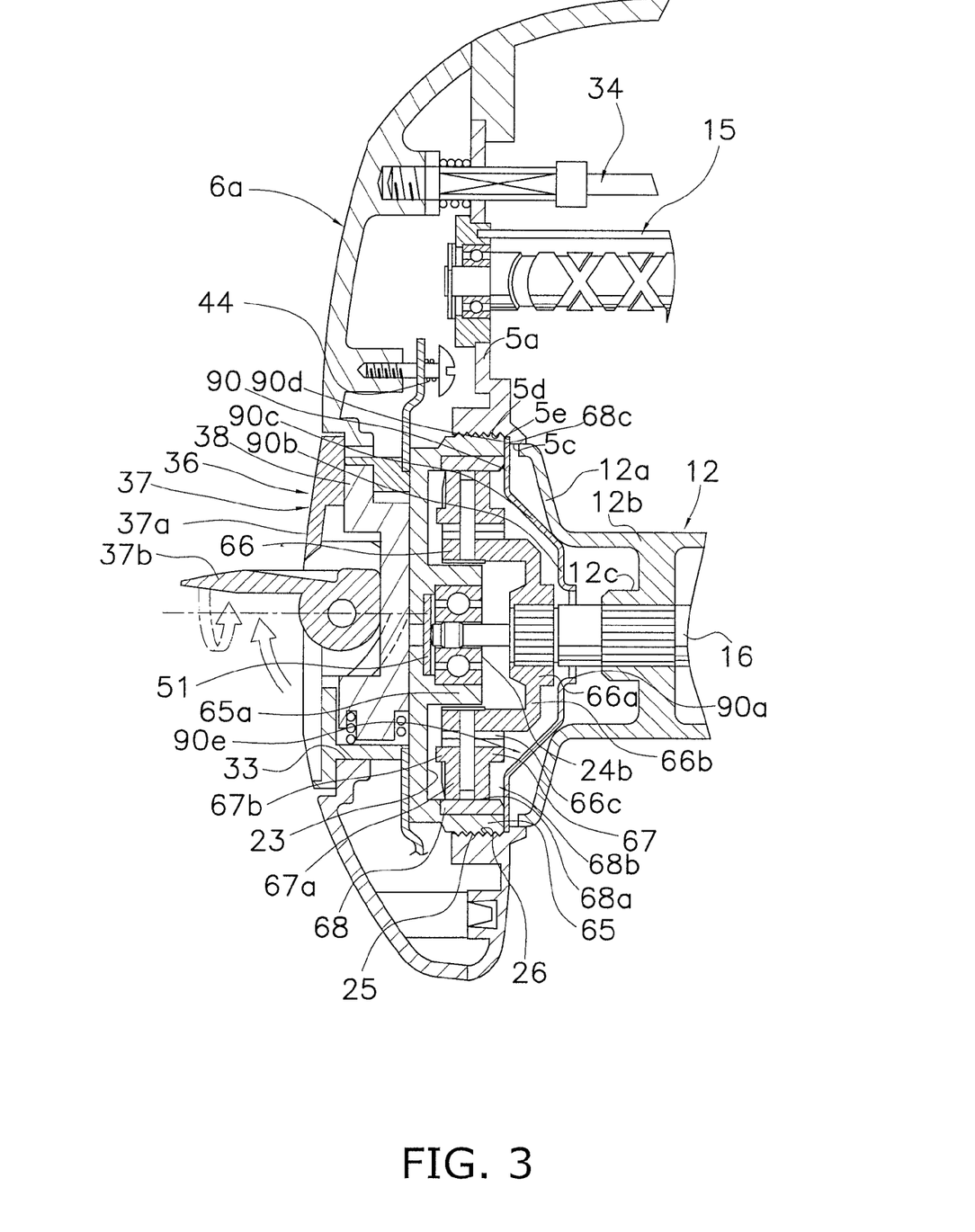
FIG. 3 is an enlarged cross-sectional view of a centrifugal brake mechanism of the dual-bearing reel.

The first side cover 6a is pivotably attached to the frame 5 for attachment/detachment of the spool 12. The first side cover 6a can be set in an opened/closed position with respect to the frame 5. As illustrated in FIG. 2, the first side cover 6a includes a pivot mechanism 34 and a lock mechanism 36 for an opening/closing operation. The pivot mechanism 34 supports the first side cover 6a positioned at the front of the frame 5. The first side cover 6a can thereby pivot and move in a direction away from the frame 5. The lock mechanism 36 is configured to lock/unlock the first side cover 6a under the condition that the first side cover 6a is positioned in a closed state. As illustrated in FIG. 3, the lock mechanism 36 includes a handling part 37 and a lock member 38. The handling part 37 is attached to an opening 33 formed in the first side cover 6a. The lock member 38 is attached to the handling part 37 while being reciprocatable in the radial direction. The handling part 37 includes a main body 37a and a handling knob 37b. The main body 37a of the handling part 37 is attached to the opening 33 while being rotatable and axially movable. The handling knob 37b is attached to the main body 37a while being pivotable about an axis in the radial direction of the main body 37a.

The main body 37a is a roughly-tubular member. The main body 37a is urged by a coil spring 44 towards the first side cover 6a. A tubular brake case 65 of a centrifugal brake mechanism 23 to be described is fixed to the main body 37a by a screw or screw.

As illustrated in FIG. 3, the brake case 65 is detachably attached to a first opening 5c and a second opening 5d. The first and second openings 5c and 5d are used for attachment/detachment of the spool 12. The first and second openings 5c and 5d are formed in the first side plate 5a, and a screw structure is thereby formed. The first opening 5c is formed on a side of the first side plate 5a where the spool 12 is disposed. The first opening 5c allows the spool 12 to penetrate its inner periphery. On the other hand, the second opening 5d is formed on another side of the first side plate 5a, which is opposite from the spool 12. The second opening 5d communicates with the first opening 5c. The diameter of the second opening 5d is greater than that of the first opening 5c. A step 5e is formed between the first opening 5c and the second opening 5d. The screw structure includes a male threaded portion 25 and a female threaded portion 26. The male threaded portion 25 is formed on the outer peripheral surface of the brake case 65. On the other hand, the female threaded portion 26 is formed on the inner peripheral surface of the second opening 5d. The female threaded portion 26 is screwed onto the male threaded portion 25.

As illustrated in FIG. 2, the frame 5 accommodates the spool 12, a level-winding mechanism 15, and a clutch lever 17. The spool 12 is disposed perpendicular to a fishing rod. The level-winding mechanism 15 uniformly winds the fishing line onto the spool 12. The clutch lever 17 functions as a thumb rest in a thumbing action. The spool 12 is allowed to penetrate the first and second openings 5c and 5d of the first side plate 5a. Further, a gear mechanism 18, a clutch mechanism 13, a clutch engagement/disengagement mechanism 19, a drag mechanism 21, and a casting control mechanism 22 are disposed between the frame 5 and the second side cover 6b. The gear mechanism 18 transmits rotational force generated by the handle 2 to the spool 12 and the level-winding mechanism 15. The clutch engagement/disengagement mechanism 19 executes engagement/disengagement and controls of the clutch mechanism 13 in response to operation of the clutch lever 17. The casting control mechanism 22 regulates resistance force to be generated in the rotation of the spool 12. Furthermore, the centrifugal brake mechanism 23 is disposed between the frame 5 and the first side cover 6a for inhibiting occurrence of backlash in casting.

As illustrated in FIG. 2, the spool 12 is mainly composed of a bobbin trunk 12b, flanges 12a, and a boss 12c. The bobbin trunk 12b is a tubular member around whose outer periphery the fishing line is wound. The flanges 12a integrally protrude from both ends of the bobbin trunk 12b to the radially outward. The boss 12c is formed in the center part of the bobbin trunk 12b. The boss 12 is formed in a disk shape. The inner periphery of the boss 12c is attached to a spool shaft 16. The flanges 12a, the bobbin trunk 12b, and the boss 12c are integrally formed by the cutting work of a magnesium alloy matrix.

As illustrated in FIG. 2, the spool shaft 16 penetrates through the second side plate 5b, and extends outward from the second side cover 6b. The extended end is rotatably supported by a boss 6c formed in the second side cover 6b through a bearing 24a. The other end of the spool shaft 16 is rotatably supported by a bearing 24b in the interior of the centrifugal brake mechanism 23. The bearings 24a and 24b are shield ball bearings.

The right end of a large diameter part 16a of the spool shaft 16 is disposed in a part of the second side plate 5b where the spool shaft 16 penetrates. An engagement pin 16b, forming a part of the clutch mechanism 13, is fixed therein. The engagement pin 16b penetrates through the large diameter part 16a along its diameter. Both ends of the engagement pin 16b protrude from the large diameter part 16a in the radial direction of the large diameter part 16a.

The gear mechanism 18 is mainly composed of a handle shaft 30, a main gear 31, and a pinion gear 32. The main gear 31 is fixed to the handle shaft 30. The pinion gear 32 is a tubular member meshing with the main gear 31. To dispose the thumb rest 8 in a vertically lower position, the handle shaft 30 of the gear mechanism 18 is positioned in a vertically lower position than that of well known arts. Therefore, the lower parts of the second side plate 5b and the second side cover 6b, both of which accommodate the gear mechanism 18, are disposed in lower positions than those of the first side plate 5a and the first side cover 6a.

As illustrated in FIG. 2, the pinion gear 32 is a tubular member that extends from the outside of the second side plate 5b to the inside. The pinion gear 32 allows the spool shaft 16 to penetrate its center part. The pinion gear 32 is attached to the spool shaft 16 while being axially movable. Additionally, the left end of the pinion gear 32 (see FIG. 2) is supported by the second side plate 5b through a bearing 43 while being rotatable and axially movable. The bearing 43 is also a shield ball bearing.

The pinion gear 32 is mainly composed of a teeth portion 32a, an interlock portion 32b, and a constricted portion 32c. The teeth portion 32a is formed on the outer periphery of the right end of the pinion gear 32 as illustrated in FIG. 2. The teeth portion 32a meshes with the main gear 31. The interlock portion 32b is formed at the left end of the pinion gear 32. The constricted portion 32c is formed between the teeth portion 32a and the interlock portion 32b. The interlock portion 32b is a recessed groove formed on the end surface of the pinion gear 32 along the diameter of the pinion gear 32. The engagement pin 16b is fixed to the spool shaft 16 while penetrating it, and is interlocked in the interlock portion 32b. Torque of the handle shaft 30 is not transmitted to the spool 12 when the engagement pin 16b of the spool shaft 16 is released from the interlock portion 32b in conjunction with outward movement of the pinion gear 32. The interlock portion 32b and the engagement pin 16b set up the clutch mechanism 13. When the engagement pin 16b is interlocked in the interlock portion 32b, torque is directly transmitted from the pinion gear 32 to the spool shaft 16, which has a diameter smaller than that of the pinion gear 32. Therefore, twist deformation is further reduced and torque transmission efficiency is thereby enhanced.

As illustrated in FIG. 2, the clutch lever 17 is disposed behind the spool 12 while being disposed in a rear position between the pair of the first and second side plates 5a and 5b.

As illustrated in FIG. 2, the clutch engagement/disengagement mechanism 19 includes a clutch yoke 40. The clutch yoke 40 is disposed on the outer periphery of the spool shaft 16. The clutch yoke 40 is supported by two pins 41 (one of them is illustrated in FIG. 2). The clutch yoke 40 can thereby move in parallel to the axis of the spool shaft 16. Additionally, the clutch yoke 40 includes an engagement portion 40a in its center part. The engagement portion 40a is engaged with the constricted portion 32c of the pinion gear 32. Springs 42 are disposed on the outer peripheries of the pins 41 supporting the clutch yoke 40, while being disposed between the clutch yoke 40 and the second side cover 6b. The springs 42 always inwardly press the clutch yoke 40.

In this structure, the pinion gear 32 is normally positioned in an inward clutch engagement position. When the engagement pin 16b of the spool shaft 16 is interlocked in the interlock portion 32b, a clutch-on state is produced. On the other hand, when the pinion gear 32 is moved outward by the clutch yoke 40, the engagement pin 16b is released from the interlock portion 32b and a clutch-off state is thereby produced.

The drag mechanism 21 is mainly composed of a drag plate 45 and a press plate 46. The drag plate 45 is pressed by the main gear 31. The press plate 46 presses the drag plate 45 towards the main gear 31 at predetermined force in conjunction with an operation of rotating the star drag 3.

The casting control mechanism 22 is mainly composed of a pair of friction plates 51 and a brake cap 52. The friction plates 51 are disposed to hold both ends of the spool shaft 16. The brake cap 52 regulates force of the friction plates 51 to hold the spool shaft 16 while interposing it between them. The left-side one of the friction plates 51 is attached in the interior of the brake case 65.

As illustrated in FIG. 3, the centrifugal brake mechanism 23 is mainly composed of the brake case 65, a brake member 68, a rotation member 66, six moving members 67, and a cover member 90. The brake case 65 is a tubular member having a length, a radius, and an end having a base extending in a radial direction of the tubular brake member perpendicular or substantially perpendicular to the length of the tubular brake member. The brake case 65 is disposed in a condition such that its opened end is opposed to the spool 12 on a side of the tubular brake case 65 opposite the base. The brake member 68 is fixed to the inner peripheral surface of the brake case 65. The rotation member 66 is fixed to the spool shaft 16 and disposed in the inner peripheral side of the brake member 68 while being concentrically disposed with it. The moving members 67 are attached to the rotation member 66 while being movable in the radial direction of the rotation member 66. In other words, the moving members 67 are axially non-movably attached to the rotation member 66, which is fixed to the spool shaft 16. The cover member 90 is attached to the first side plate 5a for covering an opening 68b produced by the brake case 65 and the brake member 68. Note the term "brake member" may also refer to a section including the brake case 65 and the brake member 68.

As illustrated in FIGS. 2 and 3, the brake member 68 is fixed to the inner peripheral surface of the brake case 65. For example, the brake member 68 is a thin cylindrical member made of a copper system alloy. The brake member 68 includes a cylindrical brake surface 68a on its inner peripheral surface. The opening 68b is produced when the brake member 68 is attached to the brake case 65. The opening 68b is thereby opened towards the spool 12. Further, the brake case 65 and the brake member 68 are both disposed on the outer rim of the opening 68b, and a section including the brake case 65 and the brake member 68 has an end surface 68c opposed to the spool 12. The brake case 65 is herein firmly screwed into the second opening 5d of the first side plate 5a. The cover member 90 is accordingly interposed between and held by the end surface (not opposed to the spool 12) of the step 5e of the first side plate 5a and the end surface 68c of the section including the brake case 65 and the brake member 68 for covering the opening 68b produced by the brake case 65 and the brake member 68.

Figure 5:
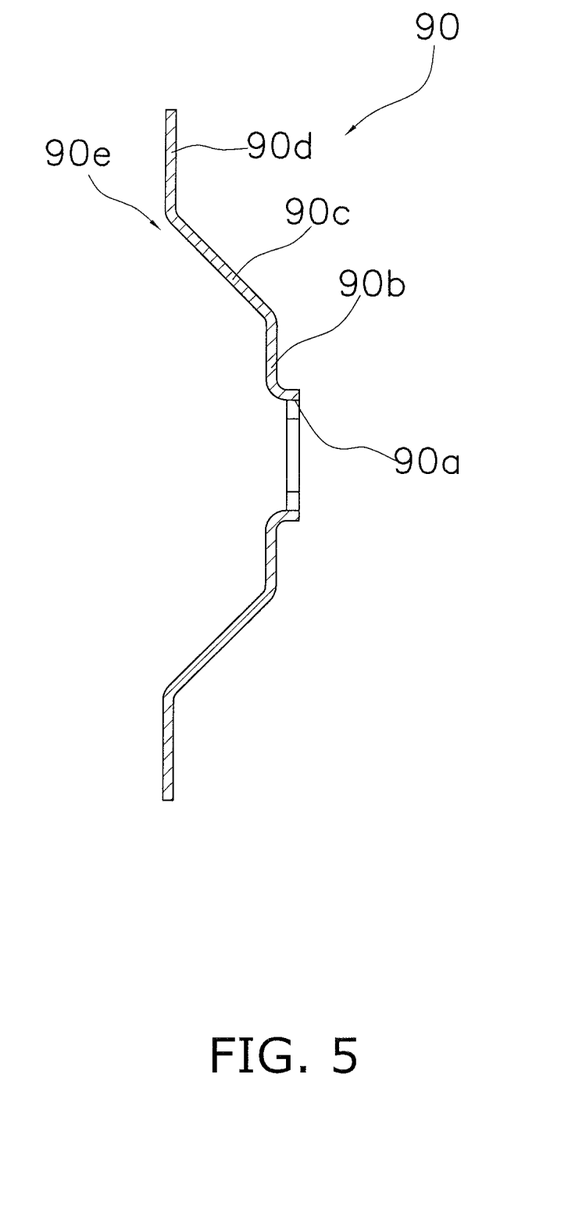
FIG. 5 is an enlarged cross-sectional view of a cover member of the dual-bearing reel.
Figure 6:
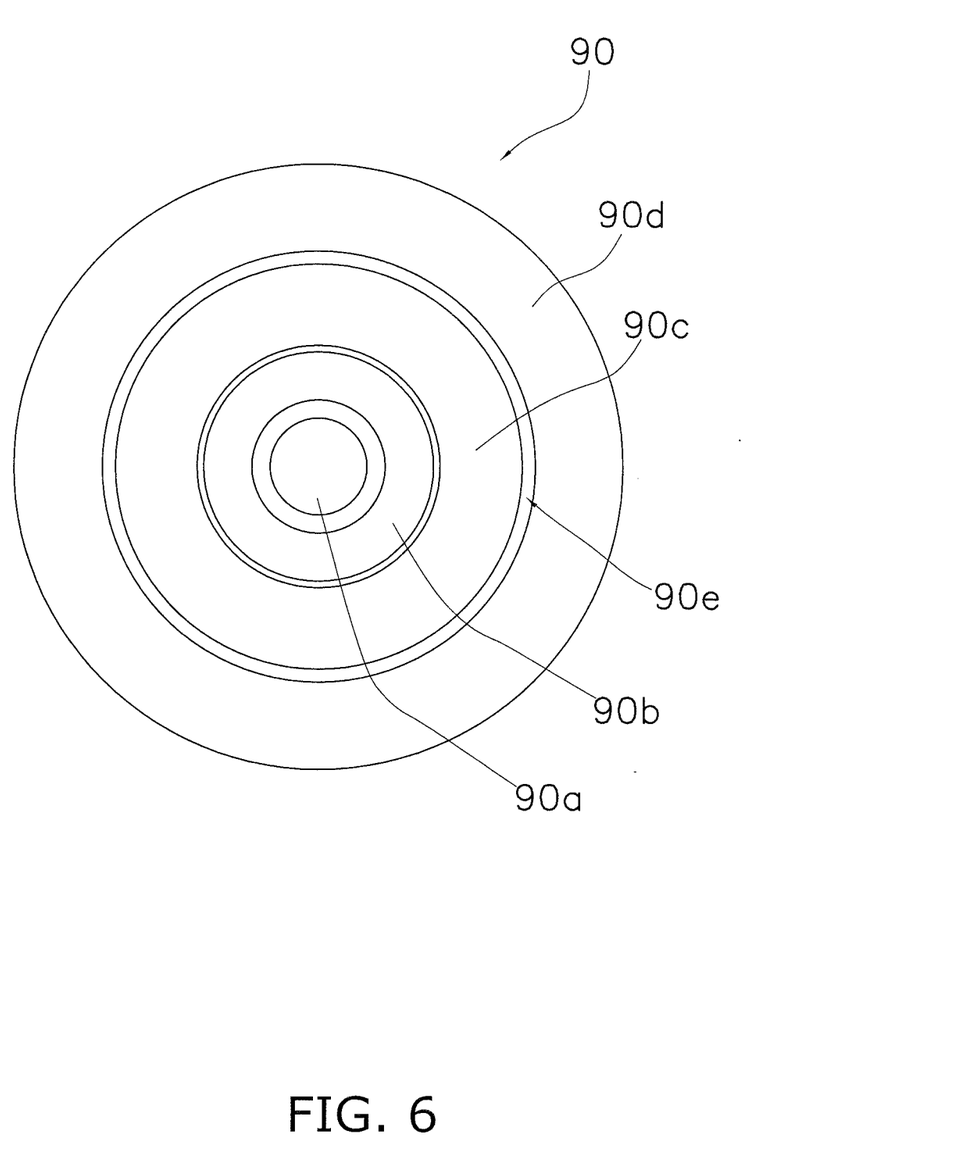
FIG. 6 is a side view of the cover member.

As illustrated in FIGS. 2 and 3, the cover member 90 is interposed between and held by the end surface (not opposed to the spool 12) of the step 5e of the first side plate 5a and the end surface 68c of the section including the brake case 65 and the brake member 68, while covering the opening 68b produced by the brake case 65 and the brake member 68. The cover member 90 is attached to the spool 12 while being relatively rotatable with it. The cover member 90 is also disposed between the rotation member 66 and the spool 12. For example, the cover member 90 is a thin plate member formed by the press working of metal (e.g., aluminum alloy). The cover member 90 is formed in a saucer shape such that the diameter thereof extends from a bottom 90b towards an opening 90e. Although the bottom 90b shown in the present embodiment is plate or disk shaped, it is not limited to this and can, for example, also be tubular. As illustrated in enlarged views of FIGS. 5 and 6, the cover member 90 is mainly composed of the bottom 90b, a through hole 90a, a slope 90c, and a tab 90d. The through hole 90a penetrates through the center of the bottom 90b. The slope 90c is coupled to the outer rim of the bottom 90b. The slope 90c increases its diameter while being sloped in an axial direction away from the spool. The tab 90d is formed in a plate shape while extending from the outer rim of the slope 90c in the radial outward direction in a direction parallel or substantially parallel to the direction in which the bottom 90b extends. The through hole 90a, the bottom 90b, the slope 90c, and the tab 90d are integrally formed by the press working of metal (e.g., aluminum alloy). The through hole 90a is formed in the center of the bottom 90b, and its inner periphery slightly protrudes from the end surface of the bottom 90b. In this embodiment, the through hole 90a is tubular or cylindrical and extends from the bottom 90b toward the spool 12. The through hole 90a allows the spool shaft 16 to penetrate through it. The diameter of the through hole 90a is slightly larger than the outer diameter of the part of the spool shaft 16 penetrating the through hole 90a. When the spool shaft 16 penetrates through the through hole 90a, the cover member 90 is held by the outer periphery of the spool shaft 16 through a predetermined clearance. The bottom 90b is a disk shaped portion that is disposed approximately perpendicular to the axis of rotation of the spool shaft 16. The bottom 90b includes the through hole 90a in its inner peripheral part. The outer peripheral part of the bottom 90b is coupled to a small-diameter part of the slope 90c. The slope 90c is formed in the shape of a circular truncated cone. Therefore, its diameter increases from its small diameter part coupled to the outer peripheral part of the bottom portion 90b to its large diameter part coupled to the inner peripheral part of the tab 90d. The slope 90c is sloped to produce a space to avoid contact with the moving members 67. With this structure, the inner periphery of the cover member 90 does not make contact with the moving members 67. Further, the outer peripheral part of the slope 90c is sloped to avoid contact with the spool 12. Similarly to the inner periphery of the cover member 90, the outer peripheral part of the cover member 90 does not make contact with the spool 12. The tab 90d is a plate shaped member coupled to the outer peripheral part of the slope 90c. The tab 90d extends in the radial outward direction. The tab 90d is interposed between and held by the end surface (not opposed to the spool 12) of the step 5e and the end surface 68c (opposed to the spool 12) of the section including the brake case 65 and the brake member 68. In this case, the cover member 90 is attached to the first side plate 5a under the condition that the tab 90d is interposed between and held by the end surface (not opposed to the spool 12) of the step 5e and the end surface 68c (opposed to the spool 12) of the section including the brake case 65 and the brake member 68 while the spool shaft 16 penetrates through the through hole 90a.

As illustrated in FIG. 3, the brake case 65 is a tubular member a length, a radius, and an end having a base extending in a radial direction of the brake case 65 perpendicular or substantially perpendicular to the length of the brake case 65. The brake case 65 includes a tubular bearing storage 65a that inwardly protrudes from its inner bottom or base. The bearing storage 65a accommodates the bearing 24b in its inner peripheral side for supporting the spool shaft 16. Thus, the bearing storage 65a can be viewed as a support portion that supports an end portion of the spool or rotation shaft 16 of the spool 12. Further, the bearing storage 65a is equipped with the friction plates 51 of the casting control mechanism 22.

As illustrated in FIG. 3, the rotation member 66 includes a secured portion 66a, a cylindrical portion 66b, and three protruding portions 66c. The secured portion 66a is secured to the spool shaft 16. The cylindrical portion 66b extends from the secured portion 66a and is disposed on the outer peripheral side of the bearing storage 65a. The protruding portions 66c protrude from the outer peripheral surface of an extended end of the cylindrical portion 66b in three radial outward directions.

Figure 4:
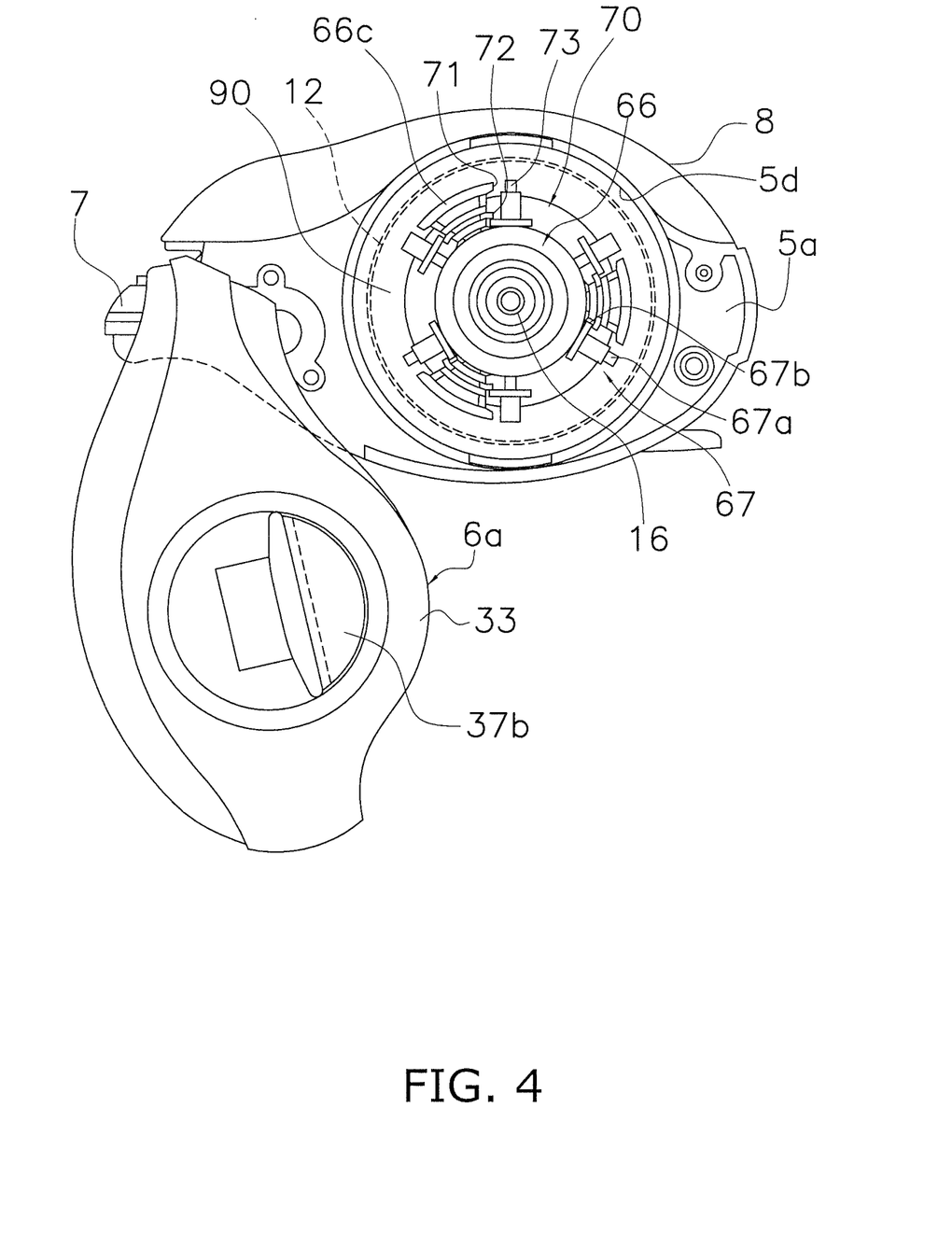
FIG. 4 is a side view of the dual-bearing reel with a first side cover removed.

The protruding portions 66c are roughly fan-shaped members that extend from the outer peripheral surface of the cylindrical portion 66b in three radial outward directions. The interior of each protruding portion 66c is formed in a lattice shape using three circular arcs in order to reduce its entire weight. Referring to FIGS. 3 and 4, to regulate movement of the moving members 67, the protruding portion 66c includes two pairs of protruding portions 71 and 72. Each of the pairs of protruding portions 71 and 72 protrudes from each of the sidewalls of the protruding portion 66c in the radial direction of the moving members 67.

As illustrated in FIG. 4, three recesses 70 are produced among the adjacent protruding portions 66c. Each recess 70 is provided to accommodate two moving members 67 and for switching between an active state to allow the moving members 67 to make contact with the brake member 68 and an inactive state for preventing the moving members 67 from making contact with the brake member 68. Further, two guide shafts 73 radially stand upright on the bottom of each recess 70 in a radial arrangement for guiding the moving members 67.

Each protruding portion 71 is formed in an opening end of each recess 70 to prevent each moving member 67 from dropping off the corresponding guide shaft 73. Each protruding portion 72 is formed in a vicinity of the bottom of each recess 70 to prevent each moving member 67 from making contact with the brake member 68.

Each moving member 67 is a roughly cylindrical member made of synthesis resin. Each moving member 67 is disposed around the corresponding guide shaft 73 while being slidable in the radial direction of the rotation member 66. Each moving member 67 is configured to make contact with the brake member 68 by way of centrifugal force that is generated by rotation of the spool 12. Further, each moving member 67 includes a main body 67a and a flange 67b. The main body 67a is a cylindrical portion guided by the guide shaft 73, whereas the flange 67b is integrally formed with the inner end of the main body 67a. The flange 67b protrudes from the inner end of the main body 67a in its radial outward direction. Accordingly, the flange 67b can be interlocked with a pair of the protruding portions 71 and 72 formed in the corresponding recess 70. The flange 67b and the protruding portions 72 form a switch mechanism or switching device 69.

When the flange 67b is positioned between the protruding portion 71 and the protruding portion 72, it is interlocked with the protruding portion 71. Accordingly, the moving member 67 is prevented from dropping off or separating from the corresponding guide shaft 73. However, the moving member 67 can still make contact with the brake member 68. This state corresponds to the aforementioned active state. On the other hand, when the moving member 67 is pressed in the radial inward direction and disposed in a further radial inward position than the protruding portion 72, the moving member 67 is interlocked with the protruding portion 72. Accordingly, the moving member 67 cannot make contact with the brake member 68. The state corresponds to the aforementioned inactive state. It is possible to regulate the number of the moving members 67 allowed to make contact with the brake member 68 in accordance with switching between the active and inactive states of the moving members 67.

In regulating the brake force, the first and second openings 5c and 5d of the first side plate 5a are uncovered by setting the first side cover 6a to be in an opened state.

To set the first side cover 6a to be in an opened state, the handling knob 37b is firstly lifted up from a locked state illustrated in FIG. 2 and then pivoted to an unlocked state shown in FIG. 3. When the handling knob 37b is set to be in the unlocked state, the lock member 38 is pressed by the handling knob 37b and accordingly moves to an unlocked position while resisting urging force of the coil spring 44. When the lock member 38 is moved to the unlocked position, its tip is disengaged from the recess of the opening 33 and thereby the main body 37a is allowed to rotate.

When the handling knob 37b is rotated under this condition, the brake case 65 rotates together with the main body 37a. Accordingly, the brake case 65 and the first side plate 5a are disengaged. In response to disengagement between the brake case 65 and the first side plate 5a, the brake case 65 is moved outward together with the main body 37a by the coil spring 44. Simultaneously, the first side cover 6a moves away from the first side plate 5a by the pivot mechanism 34. When the brake case 65 is completely removed from the outer surface of the first side plate 5a, the first side cover 6a is separated from the reel body 1 and then pivots about the axis of the pivot mechanism 34 by its own weight. Accordingly, the first cover 6a is moved to the opened position illustrated in FIG. 4.

Brake force regulation is executed by switching between the active and inactive states produced in response to movement of the moving members 67 along the guide shafts 73. When brake force regulation is completed, the first side cover 6a is set to be in the closed position. Specifically, the first side cover 6a is manually pivoted towards the closed position. Then, the handling knob 37b is pressed to insert the brake case 65 into the second opening 5d. Next, the handling knob 37b is rotated in the opposite direction to the disengagement operation of the brake case 65, while the tip of the brake case 65 is abutted. Accordingly, the brake case 65 is firmly screwed into the second opening 5d. Then, the handling knob 37b is pivoted from the unlocked position to the locked position to cause the lock member to be engaged with the recess. Consequently, the closed state of the first side cover 6a is maintained.

The centrifugal brake member 23 with the foregoing structure is provided with the cover member 90 to cover the opening 68b produced by the brake case 65 and the brake member 68. Therefore, water entrance into the interior of the brake case 65 and the brake member 68 can be blocked. In this case, water entrance into the interior of the brake member 68 can be blocked by the disposition of the cover member 90. In other words, water drops are prevented from attaching to the brake surface 68a and the moving members 67 disposed in the interior of the brake member 68. Therefore, a stable spool brake force can be reliably produced.

Further, according to the present exemplary embodiment, the cover member 90 is attached to the first side plate 51 while the spool shaft 16 penetrates it. In the adjustment of the moving members 67, the opening of the first side plate 5a is uncovered only by removing the brake member 68 whereas the cover member 90 remains to be attached to the spool shaft 16 on the first side plate 5a side. Therefore, the moving members 67 can be easily adjusted.

Other Exemplary Embodiments

Other exemplary embodiments will now be explained. In view of the similarity between the first and other embodiments, the parts of the other embodiments that are identical to the parts of the first embodiment will be given the same reference numerals as the parts of the first embodiment. Moreover, the descriptions of the parts of the other embodiments that are identical to the parts of the first embodiment may be omitted for the sake of brevity.

(a) The foregoing exemplary embodiment has exemplified the small-size low-profile dual-bearing reel. However, the shape of the dual-bearing reel is not limited to this. For example, the present invention can be applied to a large-size dual-bearing reel, a round-shaped dual-bearing reel and the like.

Figure 7:
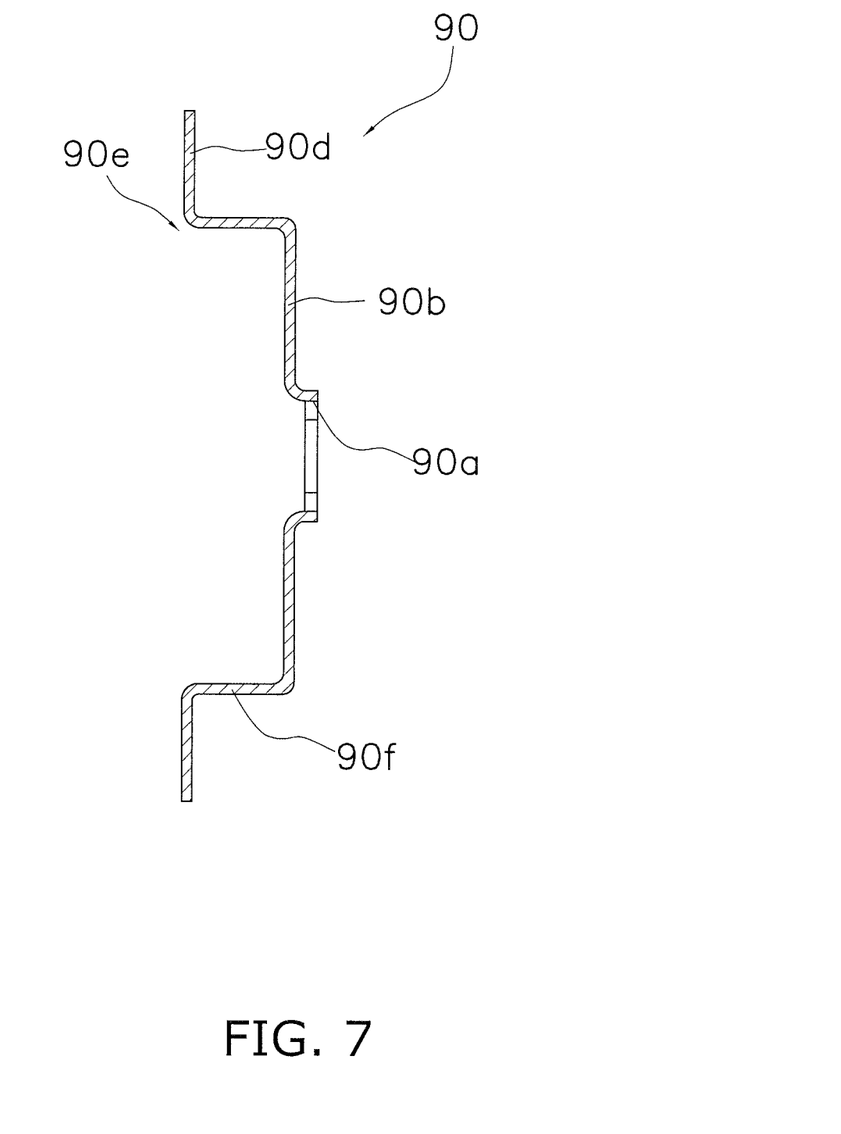
FIG. 7 is an enlarged cross-sectional view of a cover member corresponding to FIG. 5 in accordance with another exemplary embodiment.

(b) In the foregoing exemplary embodiment, the cover member 90 includes the slope 90c and is thereby formed in a saucer shape. However, a tube or cylindrical portion 90f can be alternatively provided instead of the slope 90c as illustrated in FIG. 7. The tube 90f can be perpendicular or substantially perpendicular to the bottom 90b and/or the tab 90d.

(c) In the foregoing exemplary embodiment, the cover member 90 is formed by a metal thin plate made of aluminum alloy or the like. However, material of the cover member 90 is not limited to this. For example, the cover member 90 may be made of any suitable light metal or synthetic resin.

(d) In the foregoing exemplary embodiment, the brake case 65 and the brake member are provided as separate components. However, the brake case 65 and the brake member 68 may be formed as a unitary one piece component.

(e) In the foregoing exemplary embodiment, the section including the brake case 65 and the brake member 68 has the end surface 68c opposed to the spool 12. However, the end surface (i.e., a part of 68c) of the brake member 68 may be disposed in a further radial inward position than the end surface (i.e., the rest of 68c) of the brake case 65, for instance. In this case, the tab 90d of the cover member 90 is interposed between and held by the end surface (i.e., the rest of 68c) (opposed to the spool 12) of the brake case 65 and the end surface (not opposed to the spool 12) of the step 5e for covering the opening 68b of the brake case 65.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of a reel. Accordingly, these terms, as utilized to describe the present invention should be interpreted relative to a reel as normally used. Finally, terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A dual-bearing reel spool-braking device configured to brake a spool rotatably attached to a reel body, comprising:
   first and second side plates being arranged on opposite sides of the reel body;
   a tubular brake member attached to the first or second side plate, the tubular brake member having
   a length,
   a radius,
   an end having a base extending in a radial direction of the tubular brake member substantially perpendicular to the length of the tubular brake member, and an opening, the brake member being disposed such that the opening is opposed to the spool;
a moving member axially non-movably attached to a rotation shaft of the spool, the moving member contacting an inner peripheral surface of the brake member when the moving member is moved towards the brake member by centrifugal force generated by rotation of the spool; and
a cover member attached to the first or second side plate, which is attached to the tubular brake member, to prevent water from coming into the brake member from the opening,
the first side plate including a first opening, a second opening, and a step,
the first opening allowing the spool to an inner periphery of the first opening,
the second opening having a diameter greater than that of the first opening,
the step being formed between and connects the first opening and the second opening such that the first and second openings communicate with each other,
the cover member being attached to the first side plate and being interposed between and held by an end surface of the brake member opposed to the spool and an end surface of the step not opposed to the spool.

2. The dual-bearing reel spool-braking device according to claim 1, wherein
the first side plate includes an opening having an inner periphery that the spool penetrates, and
the cover member is attached to the first side plate.

3. The dual-bearing reel spool-braking device according to claim 1, wherein
the cover member includes a plate-shaped tab interposed between and held by the end surface of the brake member opposed to the spool and the end surface of the step not opposed to the spool.

4. The dual-bearing reel spool-braking device according to claim 1, wherein
the cover member is formed in a saucer shape, and a diameter of the cover member increases in an axial direction away from the spool.

5. The dual-bearing reel spool-braking device according to claim 1, wherein
the cover member is made of a metal plate.

6. The dual-bearing reel spool-braking device according to claim 1, wherein
the brake member includes a male threaded portion arranged on an outer periphery of the brake member, and the male threaded portion is screwed into a female threaded portion formed in the opening of the first side plate.

7. The dual-bearing reel spool-braking device according to claim 1, wherein
the brake member includes a support portion that supports an end portion of the rotation shaft of the spool.

8. The dual-bearing reel spool-braking device according to claim 1, further comprising
a contact-condition switching device that switches between a contactable state and a non-contactable state in response to an external handling of the moving member, the contactable state allows the moving member to make contact with the brake member, and the non-contactable state prevents the moving member from making contact with the brake member.

9. The dual-bearing reel spool-braking device according to claim 1, wherein
the cover member is attached to the spool such that the spool is configured to rotate relatively with the cover member.

10. The dual-bearing reel spool-braking device according to claim 1,
further comprising a rotation member disposed on an inner peripheral side of the brake member, the rotation member having an outer periphery such that the moving member is radially movably attached, and the rotation member having an inner periphery fixed to the rotation shaft of the spool,
wherein
the cover member includes a through hole that is penetrated by the rotation shaft of the spool,
the through hole has a diameter greater than an outer diameter of a penetration portion of the rotation shaft of the spool, and
the cover member is disposed between the rotation member and the spool while the rotation shaft of the spool penetrates the through hole.

11. The dual-bearing reel spool-braking device according to claim 1, wherein
the cover member has
a through hole,
a bottom that extends substantially perpendicular to the rotation shaft of the spool shaft and has the through hole penetrating a center of the bottom,
a slope that extends from an outer rim of the bottom, a diameter of the slope increases in an axial direction away from the spool, and
a tab that extends from the slope in a direction substantially parallel to the direction in which the bottom extends.

12. The dual-bearing reel spool-braking device according to claim 11, wherein
the first side plate includes a first opening, a second opening, and a step,
the first opening allows the spool to penetrate an inner periphery of the first opening,
the second opening has a diameter greater than that of the first opening,
the step is formed between and connects the first opening and the second opening such that the first and second openings communicate with each other, and
the tab of the cover member is attached to the first side plate and is interposed between and held by an end surface of the brake member opposed to the spool and an end surface of the step not opposed to the spool.

13. The dual-bearing reel spool-braking device according to claim 1, wherein
the cover member has
a through hole,
a bottom that extends substantially perpendicular to the rotation shaft of the spool shaft and has the through hole penetrating a center of the bottom,
a cylindrical portion that extends substantially perpendicular from an outer rim of the bottom, and
a tab that extends from the cylindrical portion in a direction substantially parallel to the direction in which the bottom extends.

14. The dual-bearing reel spool-braking device according to claim 13, wherein
the first side plate includes a first opening, a second opening, and a step,
the first opening allows the spool to penetrate an inner periphery of the first opening, the second opening has a diameter greater than that of the first opening, the step is formed between and connects the first opening and the second opening such that the first and second openings communicate with each other, and the tab of the cover member is attached to the first side plate and is interposed between and held by an end surface of the brake member opposed to the spool and an end surface of the step not opposed to the spool.

* * * * *